United States Patent [19]

Yoda et al.

[11] Patent Number: 4,897,795
[45] Date of Patent: Jan. 30, 1990

[54] DIGITAL IMAGE ANALYSIS SYSTEM

[75] Inventors: Haruo Yoda, Tokyo; Hidenori Inouchi, Kokubunji; Hiroshi Sakou, Shiki; Yozo Ohuchi, Higashiyamato, all of Japan

[73] Assignee: Hitachi, Ltd., Tokyo, Japan

[21] Appl. No.: 155,807

[22] Filed: Feb. 16, 1988

[30] Foreign Application Priority Data

Mar. 6, 1987 [JP] Japan .................................. 62-50033

[51] Int. Cl.⁴ .............................................. G06F 15/66
[52] U.S. Cl. .................................... 364/488; 364/555; 382/47; 382/23; 382/8; 377/10
[58] Field of Search ............... 364/488, 489, 490, 491; 382/8, 22, 23, 25, 28, 47; 377/10

[56] References Cited

U.S. PATENT DOCUMENTS

| | | | |
|---|---|---|---|
| 3,619,494 | 11/1971 | Fisher | 377/10 |
| 3,908,118 | 9/1975 | Micka | 364/490 |
| 4,238,780 | 12/1980 | Doemens | 382/8 |
| 4,298,944 | 11/1981 | Stoub et al. | 382/6 |
| 4,360,799 | 11/1982 | Leighty et al. | 382/31 |
| 4,499,598 | 2/1985 | Chittineni | 382/22 |
| 4,528,634 | 7/1985 | Nakahata et al. | 364/491 |
| 4,648,120 | 3/1987 | Chittineni | 382/22 |
| 4,724,543 | 2/1988 | Klevecz et al. | 382/6 |
| 4,764,974 | 8/1988 | Woods | 382/43 |

Primary Examiner—Parshotam S. Lall
Assistant Examiner—V. N. Trans
Attorney, Agent, or Firm—Antonelli, Terry & Wands

[57] ABSTRACT

A digital image analysis system is disclosed in which a digital input image formed by a raster scan method is so modified as to fill up a hole in a clump and a recess at the bottom of a clump viewed in the sub-scanning direction of the raster scan method, for the purpose of forming a control image, the state of a clump at two consecutive scanning lines of the control image (that is, the generation and termination of the clump at one of the scanning lines or the continuity of the clump at the scanning lines) is detected from the values of adjacent pixels on the two consecutive scanning lines, and a feature value of the clump is calculated on the basis of the detected state of the clump.

10 Claims, 6 Drawing Sheets

f  INPUT IMAGE
h₁ RIGHT-DIRECTION CONTROL IMAGE
h₂ LEFT-DIRECTION CONTROL IMAGE
g  CONTROL IMAGE

DIGITAL IMAGE ANALYSIS SYSTEM

BACKGROUND OF THE INVENTION

The present invention relates to an image processing method for measuring the area, dimensions and others of each of particle images (that is, clumps) appearing on a picture image and an apparatus for carrying out the image processing method, and more particularly to an image processing method and an image processing apparatus suitable for use in an automatic image analysis system and an automatic pattern-defect inspection system.

With the recent increase in the integration density of a printed circuit board and a semiconductor circuit, an automatic visual inspection system has been earnestly developed which can automatically inspect fine pattern defects generated in fabricating the printed circuit board or semiconductor circuit, with the aid of image processing techniques. That is, owing to the increase in the integration density, it has become very difficult to visually inspect the above pattern defects. Hence, the automatic visual inspection system which can make the above inspection in place of human eyes, is very important. In order to prevent the false alarm due to pattern noise and ensure the reliability of the automatic pattern-defect inspection, it is necessary to use image processing techniques for measuring the position, dimensions, area and others of each of defect images which are obtained by defect extraction processing and indicated by a logical value "1", and for judging whether or not each defect image indicates a true defect, on the basis of the measured values. As to techniques for analyzing clumps which appear in a binary image and have a logical value "1", and for measuring the position, dimensions, area and others of each clump, many methods have been developed in the name of digital image analysis method. In order to use these methods in the automatic pattern inspection, the methods are required to carry out real-time processing. The reason for this is as follows. For example, in a case where a body to be inspected moves at a constant speed and is imaged continuously by a one-dimensional line sensor, input images are continuously applied to an inspection system by a raster scan method for a long time, and each input image contains a vast amount of data. Hence, it is very difficult to store the input images in an image memory and to process the images read out from the image memory, as in a conventional system. Thus, it is necessary to use a real-time one-pass technique, in which input images are continuously applied to an inspection system by a raster scan method, and the processing for a defect image is completed each time the defect image appears on the input images. In conventional digital image analysis, a labeling method, a tracking method and improved methods thereof have been used. In each of these methods, however, it is required to store an input image corresponding to the whole area of a display screen or an equivalent feature data in a memory. Thus, the above methods cannot be used for high-speed inspection.

The basic difficulty of the real-time, one-pass processing for input images formed by a raster scan method is based upon the variations in shape of clumps appearing on a binary image. In a case where all the clumps have convex surfaces, the processing for each clump is relatively simple. For example, in a case where a clump has the form of a spiral, it is difficult to check the continuity between those portions of the clump which intersect with one scanning line (hereinafter referred to as "intersecting portions"), and thus the processing for the clump becomes difficult. In order to solve this difficulty, the following method has been proposed. (1) The end of each intersecting portion on a scanning line is so deformed as to reach a more extending one of the end of the intersecting portion and the deformed end of a corresponding, intersecting portion on a preceding scanning line.

(2) When the end of the intersecting portion is deformed as mentioned above, a feature value of clump calculated up to the present scanning line is applied to a one-scanning-line delay circuit. A feature value due to a corresponding, intersecting portion on the next scanning line is added to the feature value outputted from the delay circuit, and the feature value thus modified is applied to the delay circuit after the end of the corresponding, intersecting portion has been deformed.

(3) The above operation is repeated and feature values are summed up till the final intersecting portion of each clump is deformed. Then, the feature value of each clump thus obtained is delivered to the outside. This method is described in U.S. Pat. No. 3,619,494.

SUMMARY OF THE INVENTION

In the above method, however, it is required to form a large, useless, deformed portion at the end of each intersecting portion of a clump. Accordingly, in a case where a portion of another clump is contained in the deformed portion, two clumps are regarded as a single clump, and thus there arises a problem that a feature value of the false clump is calculated.

It is therefore an object of the present invention to provide an ultrahigh-speed inspection system which can reduce the probability of carrying out such erroneous measurement in a great degree and is far superior in reliability to a conventional system.

The above problem of the conventional method is caused by a fact that the intermediate value of a feature is stored in a one-scanning-line delay circuit. That is, in order to correctly read out the feature value calculated up to the preceding scanning line from the delay circuit, the deformed end of an intersecting portion is required to reach the deformed end of a corresponding portion on the preceding scanning line or to be placed behind the latter end, and thus end of clump is obliged to be deformed in a great degree.

In order to solve the above problem, an ultrahigh-speed inspection system according to the present invention comprises means for storing the intermediate one of a feature value in a memory at an address determined on the basis of the arrangement order of intersecting portions on a scanning line, means for converting an input image into a digital image, and for generating a calculation control signal necessary for image analysis, on the basis of the values of adjacent pixels on two consecutive scanning lines, and means for taking the logical product of two similar deformed images formed by raster scanning operations in opposite directions, to fill a hole in a clump or a recess at the bottom thereof with a logical value "1".

According to the above inspection system, the feature value of a clump can be measured at a video-rate by the one-pass method, and moreover the deformation of the clump can be reduced to a minimum. As a result, the probability of erroneous measurement due to the overlapping of deformed images is reduced in a great degree, and the reliability of inspection is enhanced.

An inspection system according to the present invention is applied with input images continuously by a raster scan method, and the processing for a defect image is completed each time a defect image appears on the input images. That is, the inspection system uses a real-time one-pass method. Hence, it is unnecessary to store the input image in an image memory, and thus a feature value of a clump appearing on the input image can be determined by real-time processing.

DESCRIPTION OF THE PREFERRED EMBODIMENTS

Figure 1:
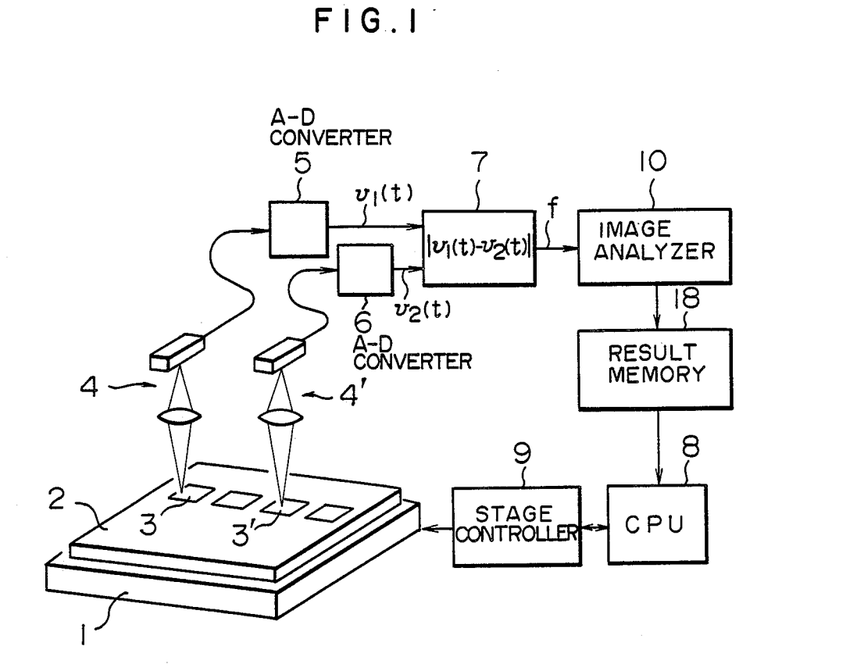
FIG. 1 shows the whole construction of an embodiment of a visual inspection system according to the present invention.

Now, explanation will be made of an embodiment of a visual inspection system according to the present invention, with reference to FIG. 1. FIG. 1 shows the whole construction of an embodiment of an inspection system for inspecting the repetition of the same pattern (for example, a die pattern) on a substrate such as a repeated circuit pattern on a semiconductor wafer on a mask pattern. Referring to FIG. 1, two dice 3 and 3' of a substrate 2 placed on a moving stage 1 are simultaneously scanned by two similar optical systems 4 and 4' each made up of a lens and an image sensor, to obtain video signals from corresponding portions of the dice 3 and 3'. The video signals thus obtained are converted by analog-digital converters 5 and 6 into digital signals $v_1(t)$ and $v_2(t)$, and a signal f indicating the absolute value of the difference between the signals $v_1(t)$ and $v_2(t)$ is delivered from a subtracter 7. Since the signals $v_1(t)$ and $v_2(t)$ are digital signals from corresponding portions of the dice 3 and 3', the difference signal f is a defect video signal which emphasizes the difference in pattern between the dice 3 and 3', that is, a defect. Accordingly, when the defect video signal f is converted into a binary signal by using a threshold value and a signal portion having a logical value "1" is taken out, a defect can be detected. This is the operation principle of the present embodiment. However, owing to the positional deviation between patterns on the dice 3 and 3' and the difference in surface state between the above patterns, various noise patterns are superposed on the defect video signal f. Accordingly, when the defect video signal f including the noise patterns is simply converted into a binary signal, many false alarms will be generated. In view of the above fact, the present embodiment includes an image analyzer 10 which is applied with the defect video signal f. The image analyzer 10 analyzes the defect video signal f, and measures the position, dimensions, area and others of an image proposed for a defect. Further, the analyzer 10 disseminate between a false defect and a true defect on the basis of the result of the above measurement, and writes the information on the true defect in a result memory 18. The contents of the result memory 18 are collected by a central processing unit (CPU) 8, and then displayed by display means to show the result of inspection. Incidentally, a stage controller 9 controls the movement of the stage 1.

By adding such an image analyzer to an inspection system, a practical, reliable inspection system can be obtained, in which inspection is not disturbed by false alarms, and a result memory does not overflow with false alarms. The gist of the present invention resides in the image analyzer indispensable for a reliable visual inspection system. The operation of the image analyzer is very complicated. Hence, the deformation of input image will first be explained, and then the contents of a sequential machine applied with the deformed image will be explained. Finally, a method of calculating a feature value of a clump will be explained.

(1) Formation of Input Image

The present invention is intended to directly process a binary image from an imaging device of the raster scan type at a video-rate. In order to clarify the following explanation, let us express the binary input image by f(i, j), where $$i = 0, 1, 2, \cdots, (I-1)$$
$$j = 0, 1, 2, \cdots, (J-1) \qquad \cdots (1)$$

Figure 2:
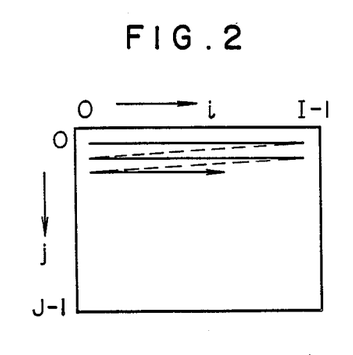
FIG. 2 is a schematic diagram showing how an input image is formed by a raster scan method.

Further, let us suppose that the raster scan is carried out in a manner shown in FIG. 2.

(2) Formation of Control Image

Figure 3A:
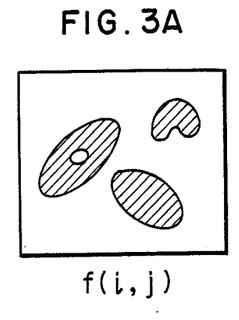
FIGS. 3A to 3D are schematic diagrams for explaining how a control image is formed from an input image.

In the image analyzer, a control signal necessary for image processing is automatically made from the input image. Accordingly, it is necessary to convert the input image into a binary control image suitable for generating the control signal. Now, explanation will be made of a method for producing a binary control image g(i, j) from the binary input image f(i, j). A right-direction control image $h_1(i, j)$ is produced by subjecting a binary input image f(i, j) which is formed by the raster scan method and shown in FIG. 3A, to recursive digital filtering given by the following equation:

$$h_1(i,j) = f(i,j) \lor h_1(i-1,j) \; h_1(i, j-1)$$
where $i = 0, 1, 2, \cdots, I-1$ \qquad (2)
$$j = 0, 1, 2, \cdots, J-1$$

Figure 3B:
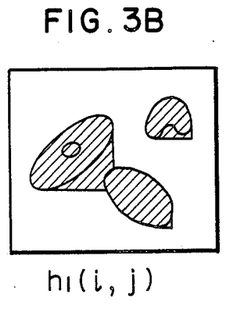

As shown in FIG. 3B, in the right-direction control image $h_1(i, j)$, clumps on the input image f(i, j) are extended on the lower right side, to fill up the recess at the bottom of a clump and a hole in another clump. Further, the raster scan conversion processing is carried out so that the scanning order in an i-direction is reversed, and then a left-direction control image $h_2(i, j)$ is produced by carrying out recursive digital filtering given by the following equation:

$$h_2(i, j) = f(i, j) \vee h_2(i + 1, j) \quad h_2(i, j - 1)$$

where $i = I - 1, I - 2, \ldots, 1, 0$ $j = 0, 1, 2, \ldots, J - 1$ (3)

Figure 3C:
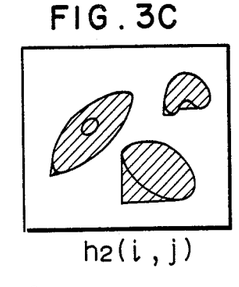

As shown in FIG. 3C, in the left-direction control image $h_2(i, j)$, the clumps on the input image $f(i, j)$ are extended on the lower left side, to fill up the above hole and recess. Then, the raster scan conversion processing with respect to the i-direction is carried out for the left-direction control image $h_2(i, j)$ so that the ordinary raster scan method is used for the image $h_2(i, j)$, and a logical product of the images $h_1(i, j)$ and $h_2(i, j)$ is made as follows.

$$g(i, j) = h_1(i, j) \wedge h_2(i, j) \quad \ldots (4)$$

Figure 3D:
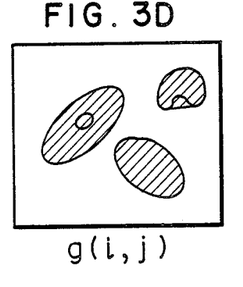

Thus, a desired control image $g(i, j)$ is obtained. FIG. 3D shows an example of the control image $g(i, j)$. As shown in FIG. 3D, useless portions appearing in FIGS. 3B and 3C are eliminated, and moreover the input image is subjected to minimum deformation so that the recess and hole are filled up. In the above operation, the processing for reversing the scanning order in the i-direction can be carried out in such a manner that an input image corresponding to one scanning line is written in a memory, and the input image is read out of the memory in the order opposite to the writing order. As mentioned above, the control image has the property of eliminating a hole in a clump and a recess at the bottom thereof. This property of the control image is very important for the operation of the image analyzer, and hence the deformed image $g(i, j)$ is herein referred to as "control image". However, the intermediate images $h_1(i, j)$ and $h_2(i, j)$ also have the above property. Hence, the image $h_1(i, j)$ or $h_2(i, j)$ may be used as a control image, in place of the image $g(i, j)$. However, as can be seen from FIGS. 3B and 3C, the images $h_1(i, j)$ and $h_2(i, j)$ have been deformed in a great degree. Accordingly, when the image $h_1(i, j)$ or $h_2(i, j)$ is used, the probability that a plurality of independent clumps are united in a single clump is high. That is, the image $g(i, j)$ is far superior to the images $h_1(i, j)$ and $h_2(i, j)$.

(3) Method of Analyzing Images

Figure 4:
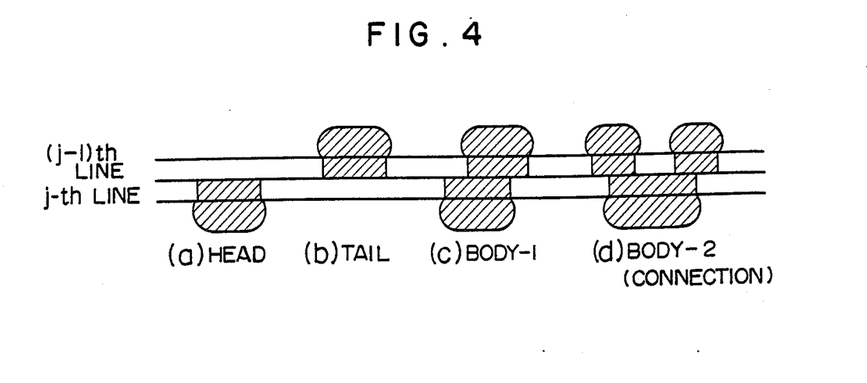
FIG. 4 is a schematic diagram showing various clumps on two consecutive scanning lines.

In a case where a binary image obtained by the raster scan method is analyzed, it is a very important problem how the continuity between individual clumps on a plurality of consecutive scanning lines is treated. This problem can be solved by observing two consecutive scanning lines simultaneously. FIG. 4 shows typical shapes of clump by using images on the j-th and (j−1)th scanning lines. Now, let us express the logical value of a pixel on the j-th scanning line by the position of $2^0$ (that is, "0" or "1") and express the logical value of a pixel on the (j−1)th scanning line by the position of $2^1$ (that is, "0" or "2"), to express a signal on the j-th and (j−1)th scanning lines by a string of numerals. It will be explained below what kind of processing is necessary for the numeral string thus obtained. When the above expression is used, a clump indicated by reference symbol (a) in FIG. 4 can be expressed by a numeral string 0111---10. This numeral string means that the clump (a) starts from the j-th scanning line, and hence it is required to open a feature value memory for the clump (a).

A clump indicated by reference symbol (b) in FIG. 4 can be expressed by a numeral string 022---20. This numeral string means that the clump (b) terminates at the (j−1)th scanning line. Accordingly, it is required to deliver a feature value of the clump (b) calculated up to the (j−1)th scanning line to the outside as the final feature value of the clump (b).

A clump indicated by reference symbol (c) can be expressed by a numeral string 0133320. In this case, the repetition of numeral "3" (that is, a string of 3's) occurs only once. This means that a clump extended up to the (j−1)th scanning line is connected with another clump on the j-th scanning line so as to show one-to-one correspondence. Accordingly, it is necessary to update a feature value calculated up to the (j−1)th scanning line so that a new feature value includes a feature value due to the clump on the j-th scanning line, and to store the new feature value in a memory.

A clump indicated by reference symbol (d) in FIG. 4 can be expressed by a numeral string 022333111333220. In this case, a string of 3's occurs twice, and a string of 1's is sandwiched between the first string of 3's and the second string of 3's. The above numeral string means that first and second clumps each extended up to the (j−1)th scanning line are connected with a third clump on the j-th scanning line, and that position in the numeral string where a numeral in the numeral string is changed from "1" to "3", indicates a position where the second clump on the (j−1)th scanning line is first connected with the third clump. Accordingly, it is necessary to combine two feature values with respect to the first and second clumps into a new feature value as soon as a numeral in the numeral train is changed from "1" to "3", and to update the new feature value so as to include a feature value due to the third clump on the j-th scanning line. Further, it is necessary to store the updated feature value in a memory. In a case where a string of 3's occurs three or more times, that is, a string portion "3"→"1" is repeated many times, a multiplicity of clumps can be combined with one another by repeating the above-mentioned processing. When the control image $g(i, j)$ is used, the first and second clumps on the (j−1)th scanning line are never combined with each other at the zero-th to (j−2)th scanning lines, and hence it is unnecessary to consider the preceding combination of the first and second clumps. Further, the third clump on the j-th scanning line is never divided into a plurality of parts at the (j+1)th and following scanning lines, and hence it is unnecessary to consider how a feature value is divided and how divided feature values are stored. In the present invention, the concept of control image is introduced to evade such problems and to facilitate the construction of the image analyzer. As can be seen from the above explanation, when a sequential machine applied with the control image for carrying out the above processing is constructed, the image analysis can be made in accordance with the raster scan method.

Further, in order to construct the image analyzer, it is important to consider how the intermediate feature value of a clump calculated up to the (j−1)th scanning line is read out of a memory and how a new feature value of the clump calculated up to the j-th scanning line is stored in the memory. This problem can be solved by allotting serial numbers to clumps (that is, intersecting portions) on each of the (j−1)th and j-th scanning lines in the order of appearance, and by using the serial numbers as the inner addresses of each of a pair of memories. For example, the clump (c) in FIG. 4 is the second intersecting portion on each of the (j−1)th and j-th scanning lines. Accordingly, a feature value of the clump (c) calculated up to the (j−1)th scanning line is read out from the address "2" of a first memory, and an updated feature value including a feature value due to the intersecting portion on the j-th scanning line is stored in a second memory at an address "2" thereof. In this case, the first and second memories act as read-out and write-in memories, respectively. When the (j+1)th scanning line is inspected, the feature value calculated up to the j-th scanning line is read out from the address "2" of the second memory, and an updated feature value is stored in the first memory at the address "2" thereof. Thus, the calculation of a feature value of the clump (c) proceeds correctly. As mentioned above, each of the first and second memories is used as a read-out memory for a scanning line and used as a write-in memory for the next scanning line. When the above read/write operation is performed, the calculation of a feature value can be correctly carried out even when a newly generated clump and a vanishing clump such as the clumps (a) and (b) exist on the control image.

Figure 5:
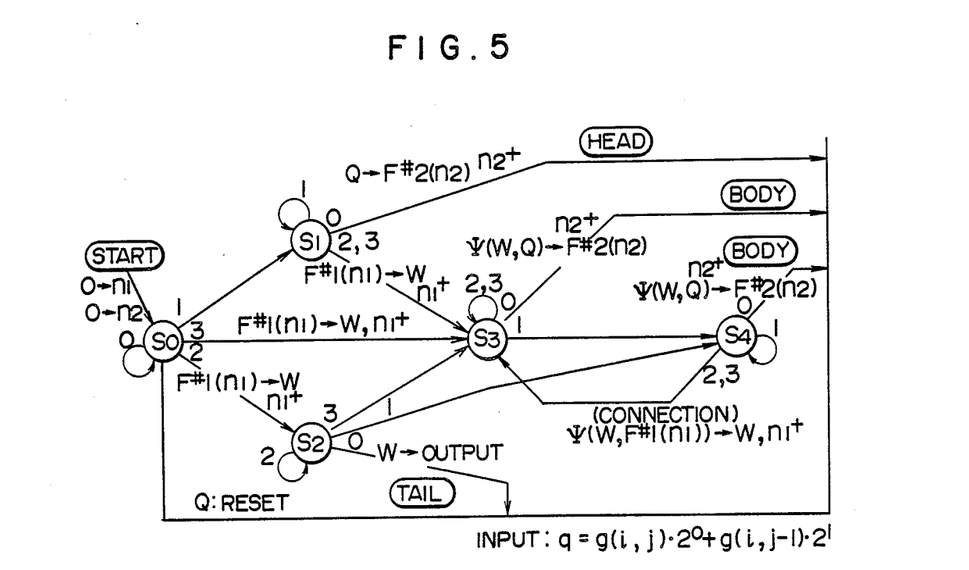
FIG. 5 is a diagram showing the state transition of a sequential machine which is the gist of the present invention.

FIG. 5 shows the above method in the form of a state transition diagram. In FIG. 5, reference symbols $S_0$ to $S_4$ designate transition states of the sequential machine, $F\#1$ a first memory for storing feature values calculated up to the (j−1)th scanning line, $F\#2$ a second memory for storing feature values calculated up to the j-th scanning line, $n_1$ an inner address of the first memory $F\#1$, $n_2$ an inner address of the second memory $F\#2$, $n_1+$ an operation for incrementing the address $n_1$ by one, $n_2+$ an operation for incrementing the address $n_2$ by one, Q a feature value calculated for one intersecting portion on the j-th scanning line, W a register for storing intermediate feature values, and $\psi$ a function for combining two feature values.

Referring to FIG. 5, at the beginning of each scanning line, the sequential machine is reset to the initial state $S_0$, and the addresses $n_1$ and $n_2$ are reset to zero. The feature values of all clumps on the control image are calculated in accordance with the state transition of FIG. 5, and as soon as all the clumps terminates in the course of the raster scan, the feature values of all the clumps are delivered to the outside. Each of the first and second memories $F\#1$ and $F\#2$ is used for alternate ones of scanning lines, and stores feature values calculated up to a scanning line. Accordingly, the storage capacity of each of the memories $F\#1$ and $F\#2$ corresponds to the maximum number of intersecting portions on one scanning line, at most.

(4) Method of Calculating Feature Values

The value Q and the function $\psi$ shown in FIG. 5 depend upon the kind of feature value to be determined. Methods of calculating the value Q and examples of the function $\psi$ for various feature values will be explained below.

Figure 6:
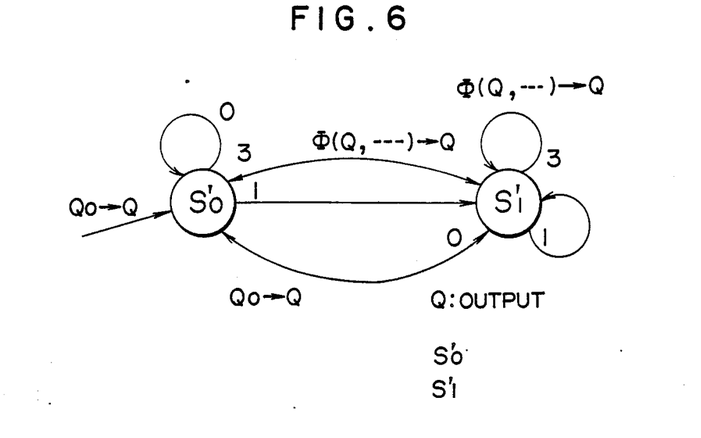
FIG. 6 is a diagram showing the state transition of the sequential machine for a case where a feature value of an intersecting portion on a scanning line is calculated.

The calculation of the feature value of one clump can be expressed by the state transition diagram of FIG. 6, provided that a value $2^0 \cdot g(i,j) + 2^1 \cdot f(i,j)$ made by combining the input image $f(i, j)$ and the control image $g(i, j)$ is used as an input value (where $2^0$ indicates 1 or 0, and $2^1$ indicates 2 or 0). An area where the control image $g(i, j)$ has a logical value "1", includes an area where the input image $f(i, j)$ has a logical value "1". Accordingly, the input value is one of the numerals 0, 1 and 3. In a case where the input value is equal to zero, an area having no clump is indicated, and hence the value Q is set to an initial value $Q_0$. In a case where the input value is equal to 3, the input image $f(i, j)$ has a logical value "1", and hence the value Q is updated with the aid of a function $\phi$. In a case where the input value is equal to 1, an area other than a true clump is indicated, and hence the value Q is kept unchanged. As mentioned above, the calculation of feature value is controlled by the control image $g(i, j)$, but is carried out only for the input image $f(i, j)$. Accordingly, the result of calculation is not affected by deformation of input image. That is, the feature values of clumps on the input image can be correctly measured, notwithstanding the input image undergoes the deformation. Actual functions $\phi$ and $\psi$ for calculating feature values will be described in the following table.

TABLE I

Method of Calculating Feature Values (Part I)

| feature value | 1-line calculation | | inter-line calculation | |
|---|---|---|---|---|
| | initial value | $Q = \phi (Q, -)$ | initial value | $W = \psi (W, Q)$ |
| area | 0 | $Q = Q + f(i, j)$ | 0 | $W = W + Q$ |
| maximum X-coordinate | 0 | $Q = \max (Q, i)$ | 0 | $W = \max (W, Q)$ |
| minimum X-coordinate | maximum integer | $Q = \min (Q, i)$ | maximum integer | $W = \min (W, Q)$ |
| maximum Y-coordinate | 0 | $Q = \max (Q, j)$ | 0 | $W = \max (W, Q)$ |
| minimum Y-coordinate | maximum integer | $Q = \min (Q, j)$ | maximum integer | $W = \min (W, Q)$ |

Further, the X- and Y-coordinates $X_m$ and $Y_m$ of the center of a clump, the length $X_p$ the projection of the clump onto an X-direction and the length $Y_p$ of the projection of the clump onto a Y-direction can be calculated on the basis of feature values of the table I in accordance with the following table.

TABLE II

Method of Calculating Feature Values (Part II)

| feature value | calculation method |
|---|---|
| X-coordinate of center ($X_m$) | $X_m$ = (minimum X-coordinate + maximum X-coordinate) × ½ |
| Y-coordinate of center ($Y_m$) | $Y_m$ = (minimum Y-coordinate + maximum Y-coordinate) × ½ |
| length of projection onto X-direction ($X_p$) | $X_p$ = (maximum X-coordinate − minimum X-coordinate) |
| length of projection onto Y-direction ($Y_p$) | $Y_p$ = (maximum Y-coordinate − minimum Y-coordinate) |

The volume of a clump is defined as the summation of multi-level values at a region which contains the clump. When a grey level image (namely, multi-level image) $f'(i, j)$ of this region is used in place of the binary image $f(i, j)$, and the equation $Q=Q+f(i,j)$ in the table I for calculating the area of a clump up to a scanning line is replaced by an equation $Q=Q+f'(i, j)$, the volume of the clump can be calculated. The binary image $f(i, j)$ can be readily obtained by carrying out threshold processing or appropriate preprocessing for the multi-level image $f'(i, j)$ which depends upon the property of the clump. The multilevel image f'(i, j) can be used in various application fields.

The total length of the projection of a clump onto an X- or Y-direction is defined as the number of pixels each having the boundary of the clump in the X- or Y-direction. Accordingly, in a case where the total length of the projection onto the X-direction is calculated, an image f'(i, j) is obtained from the image f(i, j) by the following equation:

$$f'(i,j) = f(i,j) \cdot \{1 - f(i-1,j)\} \quad \ldots (5)$$

In a case where the total length of the projection onto the Y-direction is calculated, an image f'(i, j) is obtained from the image f(i, j) by the following equation:

$$f'(i,j) = f(i,j) \cdot (1 - f(i,j-1)) \quad \ldots (6)$$

Then, the total length of the projection is calculated in the same manner as used for calculating the volume. In the above method, it is to be noted that the value of the image f'(i, j) is calculated only at a position where the image f(i, j) has a logical value "1", and hence it is necessary to define the value of image f'(i, j) contributing to the calculation, at a pixel where the image f(i, j) has the logical value "1".

Figure 7A:
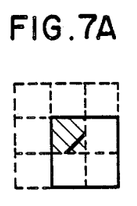
FIGS. 7A to 7H are schematic diagrams for explaining a method of calculating the length of the periphery of a clump.
Figure 7B:
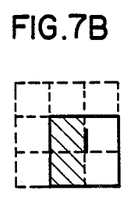
Figure 7C:
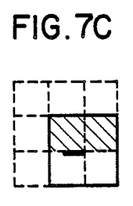
Figure 7D:
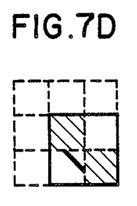
Figure 7E:
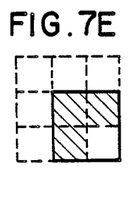
Figure 7F:
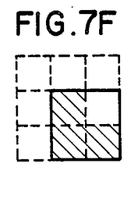
Figure 7G:
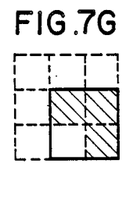
Figure 7H:
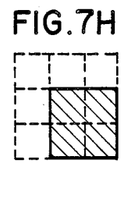

The length of periphery of a clump can be calculated in the following manner. That is, a boundary line in each pixel contributing to the length of periphery is allotted to a pixel where the image f(i, j) has a logical value "1", in the form of a density value, and the length of periphery is calculated in the same manner as used for the volume calculation. Referring to FIGS. 7A to 7H, length of a boundary line segment on the boundary of or within a "1" pixel is used alotted to as its density value of the pixel (refer to FIGS. 7A to 7C), and length of a boundary line segment contained in a "0" pixel having a logical value "0" as shown in FIGS. 7D and 7G is alloted to a "1" pixel adjacent to the "0" pixel in a clockwise direction. When attention is paid to only 2×2 pixels which exists in the lower right corner of an area containing 3×3 pixels, boundary line segments allotted to the center pixel of the 3×3 pixels are shown in FIGS. 7A to 7D and FIG. 7G. In FIGS. 7E, 7F and 7H, no boundary line exists. In a case where 2×2 pixels existing in the upper right, lower left or upper left corner of the 3×3 pixels are selected, some of the above boundary lines are allotted to the center pixel. The sum of density values due to the above boundary lines is given to the center pixel. The above method can be expressed by an equation mentioned below. Now, let us express a local image which contains 3×3 pixels and has a pixel (i, j) of the binary input image f(i, j) as the center pixel of the 3×3 pixels, as follows:

|    |    |    |
|----|----|----|
| a7 | a0 | a1 |
| a6 | a8 | a2 |
| a5 | a4 | a3 |

Then, a multi-level image f'(i, j) used for calculating the length of periphery, is given by the following equation:

$$f'(i,j) = \frac{\sqrt{2}}{2} \{a0 \cdot a1 \cdot a2 + a2 \cdot a3 \cdot a4 + a4 \cdot a5 \cdot a6 + \quad (7)$$

$$a6 \cdot a7 \cdot a0 + a0 \cdot a1 \cdot a2 + a2 \cdot a3 \cdot a4 + a4 \cdot a5 \cdot a6 + a6 \cdot$$

-continued $$a7 \cdot a0\} + \frac{1}{2} \{a0 \cdot a1 \cdot a2 + a2 \cdot a3 \cdot a4 + a4 \cdot a5 \cdot a6 +$$

$$a6 \cdot a7 \cdot a8 + a0 \cdot a1 \cdot a2 + a2 \cdot a3 \cdot a4 +$$

$$a4 \cdot a5 \cdot a6 + a6 \cdot a7 \cdot a8\}$$

where a sign "·" indicates AND processing, and "+" arithmetic addition. In a case where the calculation error due to a value $\sqrt{2}$ in the equation (7) raises a problem, an integral part corresponding to the number of longitudinal and transverse boundaries and a part corresponding to the number of oblique boundaries are calculated as different feature values, and when the feature values of all the clump are collected, two parts are combined to calculate the sum of these parts by a computer. The above calculation of feature values will be summarized in the following table III. The results shown in the tables I, II and III are typical ones of feature values determined by the present invention, and other feature values can be calculated in a similar manner.

TABLE III

Method of Calculating Feature Values (Part III)

| feature value | one-line calculation | | inter-line calculation | |
|---|---|---|---|---|
| | initial value | $Q = \phi (Q,-)$ | initial value | $W = \psi (W, Q)$ |
| volume | 0 | $Q = Q + f'(i, j)$ where f' is multi-level input image | 0 | $W = W + Q$ |
| total length of projection in X-direction | 0 | $Q = Q + f'(i, j)$ where f' is given by equation (5) | 0 | $W = W + Q$ |
| total length of projection in Y-direction | 0 | $Q = Q + f'(i, j)$ where f' is given by equation (6) | 0 | $W = W + Q$ |
| length of periphery | 0 | $Q = Q + f'(i, j)$ where f' is given by equation (7) | 0 | $W = W + Q$ |

Figure 8:
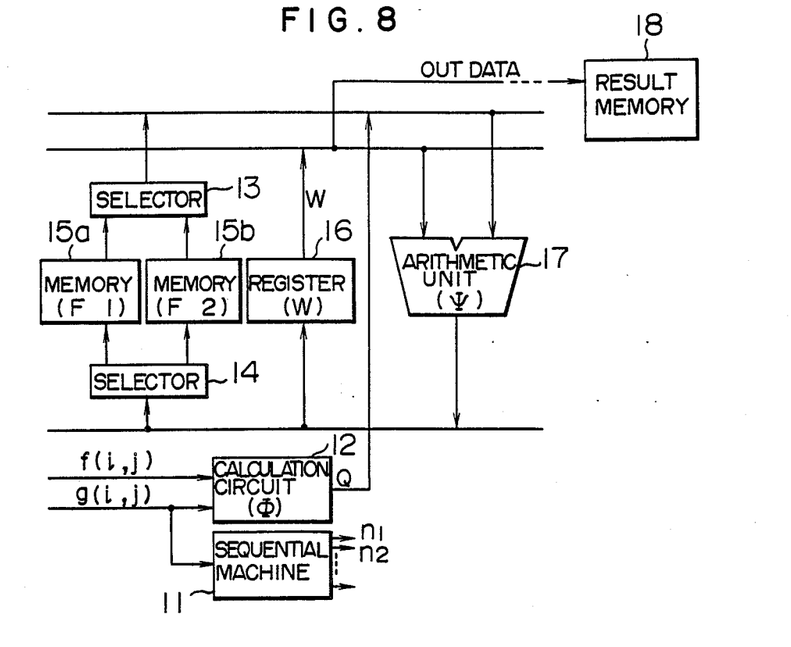
FIG. 8 is a block diagram showing an embodiment of a digital image analysis system according to the present invention.

FIG. 8 shows an embodiment of an image analyzer according to the present invention. In FIG. 8, reference numeral 11 designates a sequential machine which can be expressed by the state transition diagram of FIG. 5, and 12 to 18 a circuit part for carrying out the calculation necessary for image analysis. The sequential machine 11 is applied with the control image g(i, j), and has a function of generating a control signal for controlling the calculation. A calculation circuit 12 is applied with the input image f(i, j) and the control image g(i, j), and is used for calculating a feature value with respect to an intersecting portion on a scanning line by real-time processing. The calculation is carried out in a manner shown in the 1-line calculation column of the tables I and III, and hence varies with a feature value to be determined. The memories 15a and 15b are used for storing a feature value of a clump calculated up to a scanning line. Each of the memories 15a and 15b is changed from one of a read-out memory and a write-in memory to the other by selectors 13 and 14 at intervals of one scanning period corresponding to one scanning line. For example, the memory 15a is used as the read-out memory for even-numbered scanning lines, and is used as the write-in memory for odd-numbered scanning lines. In more detail, in a case where the j-th scanning line is an even-numbered one, a feature value of the clump calculated up to the (j−1)th scanning line is read out from the memory 15a, and the read-out feature value is updated by the calculation circuit 12 so that a new-feature value includes a feature value due to the intersecting portion on the j-th scanning line. The new feature value calculated up to the j-th scanning line is written in the memory 15b. Further, when the (j+1)th scanning line is inspected, the feature value calculated up to the j-th scanning line is read out from the memory 15b, and an updated feature value is written in the memory 15a. By exchanging the functions of the memories 15a and 15b in the above manner, a feature value of a clump can be updated successively to reach a final value. A register 16 is used for temporarily storing the result of an arithmetic operation performed by an arithmetic unit 17. The arithmetic unit 17 is used for carrying out the inter-line calculation. The selection of inputs to the unit 17 and the timing of arithmetic operation are controlled by the sequential machine 11 in accordance with the state transition shown in FIG. 5.

Figure 9:
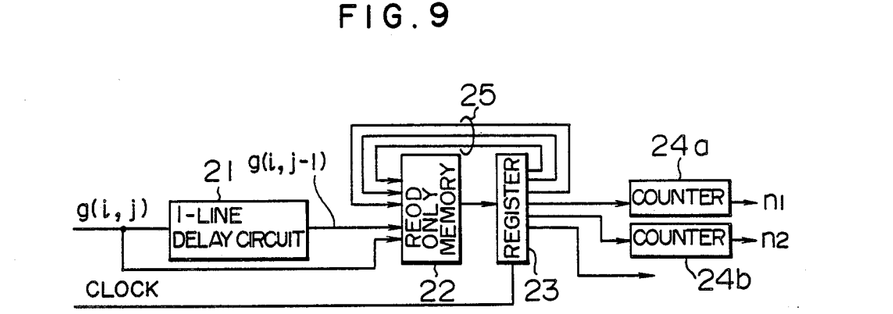
FIG. 9 is a block diagram showing an example of the sequential machine of FIG. 8.

FIG. 9 shows the detailed circuit configuration of an example of the sequential machine 11. In FIG. 9, reference numeral 21 designates a 1-line delay circuit for delivering the value of a pixel $g(i, j-1)$ which precedes an input pixel $g(i, j)$ by one scanning line, 23 a register, and 22 a read only memory (namely, ROM) for storing control data. The contents of the register 23 are updated by a clock pulse each time input data $g(i, j)$ corresponding to one pixel is applied to the sequential machine. The ROM 22 is applied with two bits indicative of $g(i, j)$ and $g(i, j-1)$ and a 3-bit signal 25 indicative of that one of transition states $S_0$ to $S_4$ of sequential machine which is held by the register 23. At this time, the contents of the ROM 22 are changed by the clock pulse so that the next one of transition states $S_0$ to $S_4$ can be delivered, and the ROM 22 delivers a control signal for performing an arithmetic operation necessary for the above state transition. Control information required includes address signals for specifying the inner addresses n1 and n2 of the memories 15a and 15b. The address signals are readily obtained by additionally providing counters 24a and 24b for counting the control signal from the ROM 22. Further, control information required to be delivered from the ROM 22 includes the write-in timing for the memory 15a or 15b, the write-in timing for the register 16, the specification of input data to the arithmetic unit 17, and the write-in timing for the result memory 18. The above control information can be readily obtained by writing data in the ROM 22 so that the ROM 22 delivers a pulse having a level "1" simultaneously with the state transition of the ROM. Means for resetting the counters 24a and 24b at the beginning of each scanning line and means for causing the selectors 13 and 14 to perform switching operations at the same time, are omitted from FIG. 9. However, it is easy to add these means to the circuit configurations of FIGS. 8 and 9. The state transition and arithmetic operations shown in FIG. 5 can be completely carried out by the circuit configurations of FIGS. 8 and 9.

Figure 10:
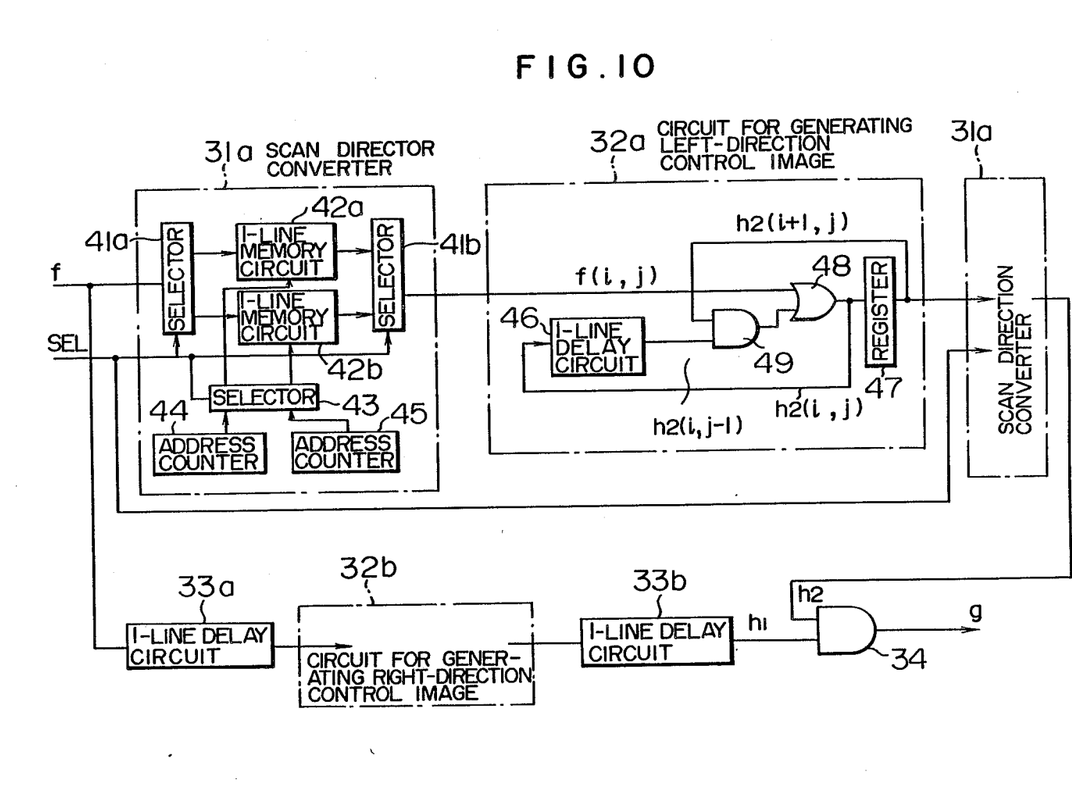
FIG. 10 is a block diagram showing an example of a circuit for obtaining a control image.

FIG. 10 shows a circuit configuration for producing the control image $g(i, j)$. In FIG. 10, reference symbols 31a and 31b designate scan direction converters for reversing the scanning order in an i-direction. Referring to FIG. 10, the scan direction converter 31a includes selectors 41a and 41b, 1-line memory circuits 42a and 42b a selector 43, and address counters 44 and 45. The address counter 44 counts up addresses from the zero-th address to the (k−1)th address in the ascending order (where k is equal to the number of pixels on one scanning line), and the address counter 45 counts up addresses from the (k−1)th address to the zero-th address in the descending order. When the input image $f(i, j)$ is applied to the converter 31a, one of the memory circuits 41a and 41b is selected by the selector 41a, and image data corresponding to one scanning line is stored in one memory circuit in the ascending order. While, the other memory circuit is selected by the selector 41b, and image data is read out from the other memory circuit in the descending order. Each of the selectors 41a, b and 43 changes one of connecting states over to the other each time a scanning operation for one scanning line is completed. Thus, read-out and write-in operations are alternately performed for each of the memory circuits 42a and 42b at intervals of one scanning period corresponding to one scanning line. Accordingly, input data are written in and read out from one of the memory circuits 42a and 42b in opposite scanning orders viewed in the i-direction. The same operation as in the scan direction converter 31a is performed in the scan direction converter 31b.

Reference symbols 32a and 32b in FIG. 10 designate circuits for generating control images $h_1(i, j)$ and $h_2(i, j)$. The circuit 32a for generating the left-direction control image $h_2(i, j)$ includes a 1-line delay circuit 46, a register 47, an OR circuit 48 and an AND circuit 49. When the input image $f(i, j)$ is applied to the circuit 32a in accordance with the raster scan method, the input image $f(i, j)$ is converted into the left-direction control image $h_2(i, j)$ which is expressed by the equation (3). The circuit 32b for generating the right-direction control image $h_1(i, j)$ has a circuit configuration similar to that of the circuit 32a, and can convert the input image $f(i, j)$ into the right-direction control image $h_1(i, j)$. One-line delay circuit 33a and 33b compensate the delay of image due to the scan direction converters 31a and 32b, respectively. Thus, the control images $h_1(i, j)$ and $h_2(i, j)$ synchronized with each other are applied to an AND circuit 34, which delivers the logical product of the control images $h_1(i, j)$ and $h_2(i, j)$, that is, the control image $g(i, j)$. Although image data is delayed little by little in the course of the above processing, the final result of measurement will not be affected by such delay.

As mentioned above, the image analysis can be completely carried out by the circuit configurations shown in FIGS. 8, 9 and 10. That is, the image analysis can be carried out by one-pass processing at a video-rate. The results of image analysis are stored in the result memory, and can be fetched from the result memory into an external computer, at need.

According to the present invention, a plurality of kinds of feature values of a clump (that is, particle) are determined at the same time. Hence, it is easy to provide a filter on the input side of the result memory so that only a clump having a specified combination of feature values is written in the result memory. Such processing is very effective for pattern inspection, since false alarms are eliminated and only true defects are extracted.

As has been explained in the foregoing, the present invention has the following advantages.

(1) Image processing is carried out in accordance with a raster scanning operation for obtaining an input image, and hence only a very small amount of image data is stored in a memory. As a result, it is not required to provide a memory circuit having a large capacity, and thus the manufacturing cost of an image analyzer is greatly reduced.

(2) All the arithmetic operations for one pixel are performed in one clock time, and thus image analysis is carried out at a video-rate. Accordingly, an ultrahigh-speed visual inspection system or pattern analysis system can be realized.

(3) Many general feature values can be calculated, and moreover the kind of calculable feature value can be increased by carrying out appropriate pre-processing for special feature values. Further, a plurality of kinds of feature values of a clump can be obtained at the same time. Accordingly, it is easy to calculate a combined feature value and to select desired ones from detected clumps on the basis of a specified combination of feature values. Such selection greatly improves the pattern analyzing ability, and can enhance the reliability of an inspection system, in which a false alarm has to be eliminated.

We claim:

1. A digital image analysis system for determining a feature value of each clump on a digital input image formed by a raster scan method, the digital image analysis system comprising:
control image producing means for producing a control image by modifying the input image so as to fill up a hole in a clump and a recess at the bottom of a clump viewed in the sub-scanning direction of the raster scan method;
state detecting means successively applied with the value of adjacent pixels on two consecutive scanning lines of the control image, for detecting the state of a clump at a predetermined one of the scanning lines (that is, the generation and termination of the clump at one of the scanning lines and the continuity of the clump at the scanning lines), on the basis of the combination of the value of the adjacent pixels; and
feature value calculating means, including two memory means each for storing a feature value of a clump calculated up to one of the scanning lines, for calculating a feature value of a clump on the basis of the detected state of the clump, updating the feature value of a clump read out from one of said two memory means so that a new-feature value is generated including a feature of a portion on the one scanning line and for storing said new feature value in the other one of said two memory means.

2. A digital image analysis system according to claim 1, wherein the control image producing means produces a right-direction control image by modifying the input image so that each clump on the input image is extended in a lower right-direction and thus a recess at the bottom of a clump is filled up, produces a left-direction control image by modifying the input image so that each clump on the input image is extended in a lower left-direction and thus a recess at the bottom of the clump is filled up, and produces the control image by taking the logical product of the right-direction and left-direction control images.

3. A digital image analysis system according to claim 2, wherein said right-direction control image $(h_1(i,j))$ and left direction control image $(h_2(i,j))$ are produced by subjecting a binary input image $f(i,j)$ to recursive digital filtering given by the following equation $h_1(i,j) = f(i,j) \vee h_1(i - 1,j) \quad h_1(i,j - 1)$ where $i = 0, 1, 2, \ldots, I - 1$ $j = 0, 1, 2, \ldots, J - 1$ $h_2(i,j) = f(i,j) \vee h_2(i + 1,j) \quad h_2(i,j - 1)$ where $i = I - 1, I - 2, \ldots, 1, 0$ $j = 0, 1, 2, \ldots J - 1.$ 4. A digital image analysis system for determining a feature value of each of clumps on a digital input image formed by a raster scan method, the digital image analysis system comprising:
means for producing a control image by modifying the input image so as to fill up a hole in a clump and a recess at the bottom of a clump viewed in the sub-scanning direction of the raster scan method;
feature value calculating means applied with the values of adjacent pixels on two consecutive scanning lines of the control image for calculating a feature value of each clump on the input image, said feature value calculating means being made up of a sequential machine having at least five internal states, a memory for storing a feature value of clump, a register, a circuit for 1-line calculation of feature value, and a circuit for inter-line calculation of feature value; and
means for controlling the initialization, update and delivery of a feature value of a clump and the synthesis of feature values of a plurality of clumps, at a time the internal state of the sequential machine is changed.

5. A digital image analysis system for determining a feature value of each of clumps on a digital input image formed by a raster scan method, the digital image analysis system comprising:
control image producing means for producing a control image by modifying the input image so as to fill up a hole in a clump and a recess at the bottom of a clump viewed in the sub-scanning direction of the raster scan method;
state detecting means successively applied with the values of adjacent pixels on two consecutive scanning lines of the control image, for detecting the state of a clump at a predetermined one of the scanning lines (that is, the generation and termination of the scanning lines and the continuity of the clump at the scanning lines), on the basis of the combination of the values of the adjacent pixels; and
feature value calculating means for calculating a feature value of a clump on the basis of the detected state of the clump;
wherein a feature value Q in the feature value calculating means, is used for determining one of the area, volume and length of periphery of a clump.

6. A digital image analysis system according to claim 5, wherein the feature value Q is calculated on the basis of the combination of the input image and the control image.

7. A digital image analysis system for determining a feature value of each of clumps on a digital input image formed by a raster scan method, the digital image analysis system comprising:

control image producing means for producing a control image by modifying the input image so as to fill up a hole in a clump and a recess at the bottom of a clump viewed in the sub-scanning direction of the raster scan method;

state detecting means successively applied with the values of adjacent pixels on two consecutive scanning lines of the control image, for detecting the state of a clump at a predetermined one of the scanning lines (that is, the generation and termination of the scanning lines and the continuity of the clump at the scanning lines), on the basis of the combination of the values of the adjacent pixels; and feature value calculating means for calculating a feature value of a clump on the basis of the detected state of the clump;

wherein when the two consecutive scanning lines are indicated by (j−1)th and j-th scanning lines, the state detecting means expresses the value of each pixel on the j-th scanning line and the value of each pixel on the (j−1)th scanning line by the positions of $2^0$ and $2^1$, respectively, to express a raster signal on the (j−1)th and j-th scanning lines by a numeral string, and detects the state of a clump at the j-th scanning line (that is, the generation and termination of the clump at one of the (j−1)th and the j-th scanning lines and the continuity of the clump at the (j−1)th and the j-th scanning lines), on the basis of the numeral string.

8. A digital memory analysis system according to claim 7, wherein the feature value calculating means uses serial numbers which indicate the appearance order of a plurality of strings of "1's" at the (j−1)th and j-th scanning lines, as the inner addresses of each of a pair of memories.

9. A digital image analysis system according to claim 7, wherein when the state detecting means detects that a clump is generated at the j-th scanning line, the feature value calculating means prepares a memory area for a feature value of the clump, wherein when the state detecting means detects that a clump terminates at the (j−1)th scanning line, the feature value calculating means delivers a feature value of the clump calculated up to the (j−1)th scanning line, and wherein when the state detecting means detects the continuity of a clump at the (j−1)th and j-th scanning lines, the feature value calculating means updates a feature value of the clump calculated up to the (j−1)th scanning line so that a new feature value includes a feature value due to the j-th scanning line, to store the new feature value in a memory.

10. A digital image analysis system according to claim 9 wherein when it is detected that first and second clumps on the (j−1)th scanning line are connected with a third clump on the j-th scanning line, feature values of the first and second clumps calculated up to the (j−1)th scanning line are combined, and the combined feature value is updated so that a new feature value includes a feature value due to the third clump on the j-th scanning line, the store the new feature value in the memory.

* * * * *